United States Patent

Sandau

[11] 3,985,197
[45] Oct. 12, 1976

[54] HYDROSTATIC POWER STEERING SYSTEM

[75] Inventor: Hartmut Sandau, Moglingen, Germany

[73] Assignee: Robert Bosch G.m.b.H., Stuttgart, Germany

[22] Filed: June 16, 1975

[21] Appl. No.: 587,434

[30] Foreign Application Priority Data
June 26, 1974  Germany............................ 2430575

[52] U.S. Cl. .............................................. 180/154
[51] Int. Cl.² .......................................... B62D 5/06
[58] Field of Search ............... 180/79.2 R, 154–163; 91/388, 461; 60/384

[56] References Cited
UNITED STATES PATENTS

| | | | |
|---|---|---|---|
| 2,766,585 | 10/1956 | Wittren | 60/384 X |
| 3,220,318 | 11/1965 | McGuire | 91/461 |
| 3,333,416 | 8/1967 | Budzich | 180/79.2 R X |
| 3,347,041 | 10/1967 | Bahniuk et al. | 180/79.2 R X |
| 3,463,260 | 8/1969 | Baines | 180/79.2 R |

*Primary Examiner*—Robert R. Song
*Assistant Examiner*—R. Schrecengost
*Attorney, Agent, or Firm*—Michael J. Striker

[57] ABSTRACT

A hydrostatic power steering system wherein the steering wheel can rotate a pilot pump which is connected with compartments at the opposite ends of a spool reciprocably received in a valve body having ports connected with a main pump, a reservoir, the chambers of a power cylinder whose piston is connected with the steering linkage, and with spaces defined by the valve body with two plungers disposed at the opposite ends of the spool. The spool is normally held in a neutral position by two centering springs which react against the respective plungers and bias two retainers into engagement with the spool. The plungers are connected to each other by a rod which is reciprocable in an axial bore of the spool. When the steering wheel is rotated in one direction, the pilot pump causes fluid to flow into one of the compartments whereby the spool is shifted to one of two operative positions and allows the main pump to supply pressurized fluid to one chamber of the power cylinder while the other chamber discharges fluid into the reservoir. If the steering wheel is rotated in the opposite direction, the main pump supplies pressurized fluid to the other chamber of the power cylinder while the one chamber discharges fluid into the reservoir. If the piston of the power cylinder is displaced in response to external influences, the spool moves to the one or the other operative position unless the steering wheel is held by the hands of the operator whereby the spool reassumes its neutral position. The chambers of the power cylinder receive pressurized fluid by way of the pilot pump.

11 Claims, 1 Drawing Figure

U.S. Patent  Oct. 12, 1976  3,985,197
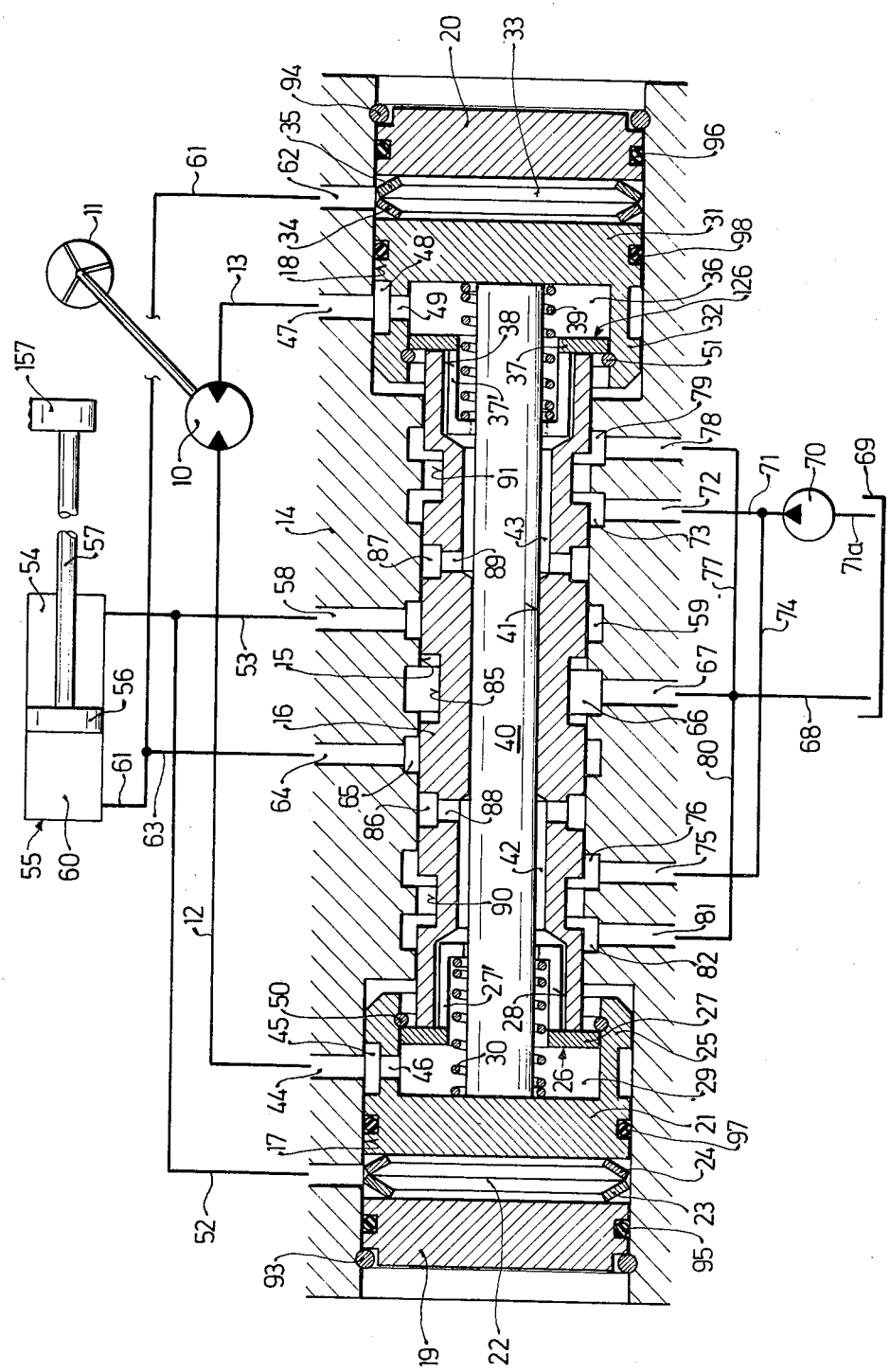

HYDROSTATIC POWER STEERING SYSTEM

BACKGROUND OF THE INVENTION

The present invention relates to power steering systems for automotive vehicles in general, and more particularly to improvements in hydrostatic power steering systems of the type wherein a valve member or spool of the hydraulic control valve is normally held in neutral position by two centering springs.

It is already known to install in a hydrostatic power steering system a pilot pump which can be actuated by the steering wheel and a main pump which is driven by a motor or generator to draw oil or another hydraulic fluid from a reservoir. Pressurized fluid can enter the one or the other chamber of a power cylinder (whose piston is connected with the steering linkage) when the spool assumes a certain position out of neutral. The spool can be shifted from neutral position to an operative position in which one of the chambers of the power cylinder receives pressurized fluid or to an operative position in which the other chamber of the power cylinder receives fluid if the pilot pump is actuated by rotating the steering wheel in the one or the other direction. When one of the chambers in the power cylinder receives pressurized fluid from the main pump, the spool connects the other chamber with the reservoir, or vice versa.

In a presently known hydrostatic power steering system of the just outlined character, the pilot pump is connected with both chambers of the power cylinder when the spool assumes its neutral position. If the operator of the vehicle thereupon rotates the steering wheel to initiate a change in direction of movement of the conveyance, the pilot pump causes fluid to flow against the one or the other end face of the spool whereby the latter moves axially and enables the main pump to cause pressurized fluid to flow through the pilot pump and to one of the two chambers in the power cylinder. A drawback of the just described power steering system is that the extent of angular movement of the steering wheel is not always truly representative of the changed direction of movement of the front wheels and also that shocks (e.g., due to external influences) which develop in the power steering system are likely to interfere with accurate steering of the vehicle.

SUMMARY OF THE INVENTION

An object of the invention is to provide a hydrostatic power steering system which invariably insures that a certain angular displacement of the steering wheel results in a predetermined change of direction.

Another object of the invention is to provide a steering sytem which enables the operator to readily detect the tendency of wheels to change direction and which also enables the operator to effect rapid return movement of the spool to its neutral position.

A further object of the invention is to provide the hydrostatic power steering system with novel and improved means for moving the spool of the hydraulic control valve to and from the neutral position, to provide a novel and improved control valve, and to provide a novel and improved valve body and spool in such control valve.

An additional object of the invention is to provide a power steering system which is constructed and assembled in such a way that a more pronounced change in the direction of movement of the vehicle necessitates the application of greater torque to the steering wheel.

A further object of the invention is to provide a hydrostatic power steering system whose operation is more reproducible than that of presently known hydrostatic power steering systems.

The invention is embodied in a hydrostatic power steering system wherein a steering linkage receives motion from the output means of hydraulic motor means having first and second chambers for reception of pressurized fluid to thereby respectively move the output means in first and second directions (the motor means may include a hydraulic double-acting power cylinder whose output means includes a differential piston and a piston rod coupled to a component of the steering linkage), wherein a bidirectional pilot pump is actuatable by the steering wheel and wherein a main pump supplies pressurized fluid and draws fluid from a reservoir. The power steering system further comprises a valve body having ports connected with the two pumps, with the chambers of the motor means and with the reservoir, a valve member which is reciprocable in the valve body between a neutral position in which the main pump supplies fluid back to the reservoir, a first operative position in which pressurized fluid flows from the main pump into the first chamber of the motor means by way of the pilot pump and the second chamber of the motor means discharges fluid into the reservoir, and a second operative position in which the second chamber receives pressurized fluid from the main pump via pilot pump and the first chamber discharges fluid into the reservoir, first and second plungers disposed at the opposite ends of the valve member and respectively defining with the valve member first and second compartments connected to the pilot pump so that actuation of the pilot pump in response to rotation of the steering wheel in first and second directions respectively results in fluid-induced movement of the valve member to the first and second operative positions, dished springs or analogous means for biasing the plungers to predetermined starting positions, helical or otherwise configurated centering springs reacting against the plungers and serving to normally maintain the valve member in the neutral position in the starting positions of the plungers, and means for operatively connecting the plungers to each other so that a movement of one of the plungers toward the respective end of the valve member entails a similar movement of the other plunger in the same direction. The plungers are displaced from their starting positions when the operating means of the motor means changes its position in response to external influences.

The novel features which are considered as characteristic of the invention are set forth in particular in the appended claims. The improved power steering system itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a partly diagrammatic and partly sectional view of a hydrostatic power steering system which embodies the invention and wherein the valve member is shown in neutral position.

DESCRIPTION OF THE PREFERRED EMBODIMENTS

The drawing shows a power steering system having a bidirectional hydraulic pilot pump 10 which can also operate as a motor and is actuated, when necessary, by a steering wheel 11. The two openings of the pump are connected with conduits 12, 13 which are further connected with the housing or body 14 of a control valve having a hollow valve member or spool 16 which is reciprocable with minimal clearance in a bore 15 of the body 14. The end portions 17, 18 of the bore 15 are enlarged and their outer ends are respectively closed and sealed by cover members 19, 20 which constitute removable portions of the valve body 14. The end portion 17 receives with minimal play a reciprocable plunger 21 which defines with the cover member 19 a fluid-containing space or chamber 22 accommodating two relatively strong prestressed dished springs 23, 24 tending to urge the plunger 21 toward the adjacent end of the valve member 16. The plunger 21 is cupped, i.e., it includes a bottom wall which is adjacent to the spring 24 and an annular extension 25 which surrounds with clearance the adjacent end portion of the valve member 16. A sleeve-like retainer 26 has a flange 27 which is slidably received in the extension 25 and a slotted cylindrical portion 27' which extends into the interior of the valve member 16. The valve member 16 has an axial bore 41 with two enlarged end portions 28, 38 the former of which receives the cylindrical portion 27' of the retainer 26. The portion 27' may have two slots which extend all the way to the flange 27 and may be disposed diametrically opposite each other. The reference character 29 denotes a compartment which is defined by the valve member 16 and plunger 21 and forms part of the enlarged portion 17 of the bore 15 in the valve body 14. A relatively weak helical centering spring 30 reacts against the inner side of the bottom wall of the plunger 21 and bears against an inwardly extending collar of the slotted cylindrical portion 27'. This spring urges the flange 27 of the retainer 26 against a split ring 50 which is inserted into a groove in the internal surface of the extension 25.

The right-hand enlarged end portion 18 of the bore 15 in the valve body 14 receives a second plunger 31 which is mirror symmetrical to the plunger 21 and has an annular extension 32, two dished springs 34, 35 which are installed in the space or chamber 33 between the plunger 31 and cover member 20, a retainer 126 having a flange 37 and a slotted cylindrical portion 37', a helical centering spring 39 which is installed in a compartment 36, and a split ring 51 which is received in a groove machined into the internal surface of the extension 32. The slotted cylindrical portion 37' extends into the aforementioned enlarged end portion 38 of the bore 41 in the valve member 16. The inner end portion of the slotted cylindrical portion 37' has an inwardly extending collar which is engaged by the leftmost convolution of the centering spring 39.

The plungers 21, 31 may but need not be rigidly coupled to each other by an operative connection here shown as a rod 40 which is received in the bore 41 of the valve member 16. It is normally sufficient if the bottom walls of the plungers 21, 31 bear against the respective end faces of the rod 40 under the action of dished springs 23, 24 and 34, 35 and/or in response to pressure of fluid in the spaces 22, 33.

The enlarged end portions 28, 38 of the bore 41 are outwardly adjacent to smaller-diameter enlarged portions 42, 43 of this bore, i.e., the rod 41 is substantially sealingly received only in that (median) portion of the bore 41 which extends between the portions 42, 43.

The conduit 12 communicates with a port 44 which is machined into the body 14 of the control valve and is in communication with an annular groove 45 machined into the periphery of the extension 25 of plunger 21. The extension 25 is further formed with a radial bore 46 which establishes communication between the groove 45 and the compartment 29. The conduit 13 communicates with a port 47 of the valve body 14 and this port communicates with an annular groove 48 machined into the periphery of the extension 32 of plunger 31. The extension 32 has a radial bore 49 which connects the groove 48 with the compartment 36.

The bias of dished springs 23, 24 and 34, 35 exceeds the bias of helical centering springs 30, 39.

The space 22 between the cover member 19 and plunger 21 communicates with a conduit 52 which is in communication with a further conduit 53. One end of the conduit 53 communicates with the chamber 54 of a hydraulic motor here shown as a double-acting power cylinder 55 having output means including a differential piston 56 and a piston rod 57 which is coupled to a component 157 of the steering linkage. The other end of the conduit 53 communicates with a port 58 and, through the medium of this port, with an annular recess 59 machined into the internal surface of the valve body 14. The other chamber 60 of the power cylinder 55 (this chamber is remote from the piston rod 57) communicates with a conduit 61 which is connected to a port 62, and through the medium of this port, with the space 33 between the cover member 20 and plunger 31. The conduit 61 further communicates with a conduit 63 which is connected to a port 64 of the valve body 14. The port 64 communicates with an annular recess 65 machined into the internal surface of the valve body 14. The recesses 59, 65 are disposed at the opposite sides of and are spaced apart from a substantially centrally located recess 66 which is machined into the internal surface of the valve body 14 and communicates with a port 67 connected to a reservoir or tank 69 for oil or another suitable hydraulic fluid by a return conduit 68.

The power steering system further comprises a motor- or generator-driven main pump 70 which draws fluid from the tank 69 via conduit 71a and delivers pressurized fluid into a supply conduit 71 connected to a port 72 of the valve body 14. The port 72 communicates with a recess 73 machined into the internal surface of the valve body 14. The conduit 71 further communicates with a supply conduit 74 which is connected to a port 75 of the valve body 14. The latter has an annular internal recess 76 which communicates with the port 75. The return conduit 68 communicates with additional return conduits 77 and 80 which, in turn, communicate with ports 78, 81 of the valve body 14. The ports 78, 81 respectively communicate with annular recesses 79, 82 which are machined into the internal surface of the valve body 14. As shown, the internal surface of the body 14 has a total of seven internal recesses including the substantially centrally located recess 66, the two outermost recesses 79, 82, the recesses 59, 65 which are rather closely adjacent to the central recess 66, and the recesses 73, 76 which are respectively located between the recesses 59, 79 and 65, 82.

The central portion of the peripheral surface of the valve member 16 has a circumferential groove 85 which normally registers only with the central recess 66 but can be shifted axially of the rod 40 to move into register with the recess 59 or 65. The groove 85 is flanked by and spaced apart from annular grooves 86, 87 which are also machined into the peripheral surface of the valve member 16 and respectively communicate with the enlarged portions 42, 43 of the bore 41 by way of radial bores 88, 89 machined into the cylindrical wall of the valve member 16. Still further, the valve member 16 has two additional or outermost annular grooves 90, 91 which, in the illustrated neutral position of this valve member, respectively communicate with the recesses 76, 82 and 73, 79.

The cover members 19, 20 are held against movement away from each other by split rings 93, 94 which extend into grooves machined into the surfaces respectively surrounding the end portions 17, 18 of the bore 15 in the valve body 14. The valve including the body 14 and valve member 16 further comprises a number of ring-shaped sealing elements including those shown at 95, 96, 97, 98.

The operation is as follows:

In the neutral position of the steering wheel 11, the dished springs 23, 24 and 34, 35 respectively maintain the plungers 21, 31 in the starting positions shown in the drawing. The valve member 16 is centered between the plungers 21, 31 by the helical centering springs 30, 39. The main pump 70 is driven by the motor or generator so that it conveys fluid from the tank 69 (via conduit 71a) into the conduits 71 and 74. Such fluid flows into the ports 72, 75, recesses 73, 76, grooves 91, 90, recesses 79, 82, ports 78, 81, conduits 77, 80 and back to the tank 69 via conduit 68. The chambers 54, 60 of the power cylinder 55 are sealed from the pumps 10 and 70.

If the operator of the vehicle which embodies the power steering system rotates the steering wheel 11 in a clockwise direction, as viewed in the drawing, the pilot pump 10 forces fluid to flow via conduit 12 into the compartment 29 between the plunger 21 and valve member 16. The latter is thereby shifted in a direction to the right to assume a first operative position whereby the groove 87 communicates with the recess 73 and the latter is sealed from the groove 91. Pressurized fluid is free to flow from the supply conduit 71 into the groove 87 and through the bore 89 to enter the enlarged portion 43 of the bore 41. Such fluid then flows through the compartment 36, bore 49, groove 48, port 47 and into the conduit 13, i.e., into the corresponding (inlet) opening of the pilot pump 10. The fluid flows through the pump 10 and conduit 12, into the compartment 29, larger-diameter portion 42 of the bore 41, bore 88, groove 86 (which is in communication with the recess 65), recess 65, port 64, conduit 63, conduit 61 and into the left-hand chamber 60 of the power cylinder 55. The piston 56 is shifted in a direction to the right to actuate the component 157 of the steering linkage via piston rod 57 and to thus assist the steering operation. Pressurized fluid which enters the conduit 61 also flows into the space 33 between the cover member 20 and plunger 31.

At the same time, the chamber 54 of the power cylinder 55 can discharge fluid into the tank 59 via conduit 53, port 58, recess 59 (which communicates with the groove 85), groove 85, recess 66, port 67 and return conduit 68.

If the operator of the vehicle rotates the steering wheel 11 in a counterclockwise direction, as viewed in the drawing, the pilot pump 10 causes hydraulic fluid to flow in the conduit 13 and into the compartment 36. Such fluid moves the valve member 16 in a direction to the left (i.e., to a second operative position) so that the groove 86 moves into register with the recess 76 in the valve body 14. Pressurized fluid is then free to flow from the outlet of the main pump 70, via supply conduits 71, 74, port 75, recess 76, groove 86, bore 88, portion 42 of the bore 41, compartment 29, bore 46, groove 45, port 44 and into the conduit 12, i.e., back to the corresponding (inlet) opening of the pilot pump 10. The fluid drives the pump 10 so that the latter acts as a motor and conveys additional fluid into the compartment 36 whence the fluid flows into the enlarged portion 43 of the bore 41, bore 89, groove 87 (which is then in communication with the recess 59), recess 59, port 58, conduit 53 and into the chamber 54 of the power cylinder 55. The piston 56 moves in a direction to the left so that the piston rod 57 actuates the component 157 of the steering linkage in the desired direction. At the same time, fluid can flow from the chamber 60 to the tank 69 via conduits 61, 63, port 64, recess 65 (which is then in communication with the groove 85), groove 85, recess 66, port 67 and conduit 68. Some of the fluid which flows in the conduit 53 enters the conduit 52 and flows into the space 22 between the cover member 19 and plunger 21.

If the pressure of fluid in the chamber 54 or 60 of the power cylinder 55 increases due to an external influence, the pressure is communicated to fluid in the conduits 53, 52 or 61, 63 and to the space 22 or 33. For example, if the pressure of fluid in the chamber 54 rises abruptly because the steering linkage pulls the piston rod 57 in a direction to the right, the volume of the space 22 increases and the plungers 21, 31 move as a unit in a direction to the right due to the provision of connecting rod 40. The valve member 16 shares such rightward movement of the plungers 21, 31 under the action of the centering spring 30 and retainer 26. Let it be assumed that the valve member 16 was held in the neutral position which is shown in the drawing, and that a rise of fluid pressure in the chamber 54 of the power cylinder 55 has caused the valve member 16 to move in a direction to the right. If the operator releases the steering wheel 11, the pilot pump 10 is operated as a motor because it receives pressurized fluid from the main pump 70 via supply conduit 71, port 72, recess 73 (which is then in communication with the groove 87), groove 87, bore 89, enlarged portion 43 of the bore 41, compartment 36, bore 49, groove 48, port 47 and conduit 13. If the operator holds on to the steering wheel 11, the valve member 16 automatically returns to the neutral position because the conduit 52 communicates with the tank 69 via conduit 53, port 58, recess 59 (which communicates with the groove 85), groove 85, port 67 and conduit 68. The dished springs 34, 35 then return the valve member 16 to a neutral position by way of the plunger 31, centering spring 39 and retainer 126. The pressure of fluid which has tended to rotate the pilot pump 10 must be overcome by the operator who senses the magnitude of torque and is thus apprised of the extent of the steering operation. The situation is analogous when the pressure in the chamber 60 rises so that the valve member 16 is shifted in a direction to the right because the fluid issuing from chamber 60 flows into the space 33 via conduit 61 and port 62.

An important advantage of the improved power steering system is that its operation is highly reproducible, i.e., that a certain angular displacement of the steering wheel invariably results in a predetermined change of direction of movement of the vehicle. Furthermore, the driver can feel the extent of change of direction because a greater change necessitates the application of more pronounced torque to the steering wheel.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters patent is set forth in the appended claims.

I claim:

1. In a hydrostatic power steering system wherein a steering linkage receives motion from the output means of hydraulic motor means having first and second chambers for reception of pressurized fluid to thereby respectively move the output means in first and second directions, wherein a bidirectional pilot pump is actuatable by the steering wheel and wherein a main pump supplies pressurized fluid and draws such fluid from a reservoir, a combination comprising a valve body having ports connected to said pumps, said chambers and said reservoir; a valve member reciprocable in said body between a neutral position in which said main pump supplies fluid to said reservoir, a first operative position in which pressurized fluid flows into said first chamber and said second chamber discharges fluid into said reservoir, and a second operative position in which said second chamber receives pressurized fluid and said first chamber discharges fluid into said reservoir; first and second plungers separate from the opposite ends of and respectively defining with said valve member first and second fluid-containing compartments connected to said pilot pump so that actuation of said pilot pump in response to rotation of said steering wheel in first and second directions respectively results in fluid-induced movement of said valve member to said first and second operative positions; means for biasing said plungers to predetermined starting positions; centering springs reacting against said plungers and arranged to normally maintain said valve member in said neutral position in said starting positions of said plungers; and means for operatively connecting said plungers to each other so that a movement of one of said plungers in a direction toward the respective end of said valve member entails a similar movement of the other plunger in said last mentioned direction.

2. A combination as defined in claim 1, wherein said motor means comprises a double-acting power cylinder and said output means comprises a differential piston reciprocable in said cylinder and being disposed between said chambers, said main pump being arranged to supply pressurized fluid to said first and second chambers through said pilot pump in said first and second operative positions of said valve member.

3. A combination as defined in claim 1, wherein said valve member is a spool having a peripheral surface and a plurality of annular grooves in said peripheral surface, said grooves including a substantially centrally located first groove which communicates with said reservoir in each position, with said second chamber in said first operative position and with said first chamber in said second operative position of said valve member, a second groove located at one side of said first groove and communicating with said first compartment, and a third groove located at the other side of said first groove and communicating with said second compartment.

4. A combination as defined in claim 1, further comprising first and second conduits respectively connecting said pilot pump with said first and second compartments.

5. A combination as defined in claim 1, wherein said connecting means is rigid with said plungers.

6. In a hydrostatic power steering system wherein a steering linkage receives motion from the output means of hydraulic motor means having first and second chambers for reception of pressurized fluid to thereby respectively move the output means in first and second directions, wherein a bidirectional pilot pump is actuatable by the steering wheel and wherein a main pump supplies pressurized fluid and draws such fluid from a reservoir, a combination comprising a valve body having ports connected to said pumps, said chambers and said reservoir; a valve member having an axial bore reciprocable in said body between a neutral position in which said main pump supplies fluid to said reservoir, a first operative position in which pressurized fluid flows into said first chamber and said second chamber discharges fluid into said reservoir, and a second operative position in which said second chamber receives pressurized fluid and said first chamber discharges fluid into said reservoir; first and second plungers disposed at the opposite ends of and respectively defining with said valve member first and second fluid-containing compartments connected to said pilot pump so that actuation of said pilot pump in response to rotation of said steering wheel in first and second directions respectively results in fluid-induced movement of said valve member to said first and second operative positions; means for biasing said plungers to predetermined starting positions; centering springs reacting against said plungers and arranged to normally maintain said valve member in said neutral position in said starting positions of said plungers; and means for operatively connecting said plungers to each other so that a movement of one of said plungers in a direction toward the respective end of said valve member entails a similar movement of the other plunger in said last mentioned direction, said connecting means comprising a rod reciprocably received in said axial bore of said valve member.

7. In a hydrostatic power steering system wherein a steering linkage receives motion from the output means of hydraulic motor means having first and second chambers for reception of pressurized fluid to thereby respectively move the output means in first and second directions, wherein a bidirectional pilot pump is actuatable by the steering wheel and wherein a main pump supplies pressurized fluid and draws such fluid from a reservoir, a combination comprising a valve body having ports connected to said pumps, said chambers and said reservoir; a valve member reciprocable in said body between a neutral position in which said main pump supplies fluid to said reservoir, a first operative position in which pressurized fluid flows into said first chamber and said second chamber discharges fluid into said reservoir, and a second operative position in which said second chamber receives pressurized fluid and said first chamber discharges fluid into said reservoir; first and second plungers having annular extensions disposed at and spacedly surrounding the opposite ends of and respectively defining with said valve member first and second fluid-containing compartments connected to said pilot pump so that actuation of said pilot pump in response to rotation of said steering wheel in first and second directions respectively results in fluid-induced movement of said valve member to said first and second operative positions; means for biasing said plungers to predetermined starting positions; centering springs reacting against said plungers and arranged to normally maintain said valve member in said neutral position in said starting positions of said plungers; means for operatively connecting said plungers to each other so that a movement of one of said plungers in a direction toward the respective end of said valve member entails a similar movement of the other plunger in said last mentioned direction; and retainers axially movably received in said extensions of said plungers and bearing against the respective end of said valve member under the action of said centering springs.

8. In a hydrostatic power steering system wherein a steering linkage receives motion from the output means of hydraulic motor means having first and second chambers for reception of pressurized fluid to thereby respectively move the output means in first and second directions, wherein a bidirectional pilot pump is actuatable by the steering wheel and wherein a main pump supplies pressurized fluid and draws such fluid from a reservoir, a combination comprising a valve body having ports connected to said pumps, said chambers and said reservoir; a valve member reciprocable in said body between a neutral position in which said main pump supplies fluid to said reservoir, a first operative position in which pressurized fluid flows into said first chamber and said second chamber discharges fluid into said reservoir, and a second operative position in which said second chamber receives pressurized fluid and said first chamber discharges fluid into said reservoir; first and second plungers disposed at the opposite ends of and respectively defining with said valve member first and second fluid-containing compartments connected to said pilot pump so that actuation of said pilot pump in response to rotation of said steering wheel in first and second directions respectively results in fluid-induced movement of said valve member to said first and second operative positions, said first and second plungers also respectively defining with said body first and second fluid-containing spaces remote from the respective ends of said valve member; means for biasing said plungers to predetermined starting positions, said biasing means comprising springs in said fluid-containing spaces; centering springs reacting against said plungers and arranged to normally maintain said valve member in said neutral position in said starting positions of said plungers; and means for operatively connecting said plungers to each other so that a movement of one of said plungers in a direction toward the respective end of said valve member entails a similar movement of the other plunger in said last mentioned direction.

9. A combination as defined in claim 8, wherein said body has a bore for said valve member, an internal surface surrounding said bore, and a plurality of annular recesses in said surface, said recesses including a substantially centrally located recess communicating with said reservoir, second and third recesses flanking said first recess and respectively communicating with said first and second chambers, fourth and fifth recesses flanking said second and third recesses and communicating with said main pump, and sixth and seventh recesses flanking said fourth and fifth recesses and communicating with said reservoir.

10. A combination as defined in claim 8, wherein said springs in said spaces are dished springs.

11. A combination as defined in claim 8, wherein the bias of said springs in said spaces exceeds the bias of said centering springs.

* * * * *